March 3, 1964 R. L. TWEEDALE 3,123,235
GRAIN TANK AND CONVEYOR MECHANISM FOR COMBINES
Filed Nov. 29, 1962 2 Sheets-Sheet 1

INVENTOR.
Ralph L. Tweedale
BY
Wolfe, Hubbard, Voit & Osann
ATTORNEYS.

March 3, 1964 R. L. TWEEDALE 3,123,235
GRAIN TANK AND CONVEYOR MECHANISM FOR COMBINES
Filed Nov. 29, 1962 2 Sheets-Sheet 2

INVENTOR.
Ralph L. Tweedale
BY
Wolfe, Hubbard, Voit & Osann
ATTORNEYS.

United States Patent Office 3,123,235
Patented Mar. 3, 1964

3,123,235
GRAIN TANK AND CONVEYOR MECHANISM FOR COMBINES
Ralph L. Tweedale, Southfield, Mich., assignor to Massey-Ferguson Inc., Detroit, Mich., a corporation of Maryland
Filed Nov. 29, 1962, Ser. No. 240,949
5 Claims. (Cl. 214—17)

This invention relates generally to crop harvesting machines such as self-propelled combines, and concerns, more particularly, an improved grain tank and conveyor mechanism for temporarily storing and handling harvested grain in such machines.

A self-propelled combine of the type with which the invention is concerned includes a pair of grain receiving tanks arranged to straddle the cleaning and separating unit of the combine. A crop conveyor at the bottom of the cleaning and separating unit collects the threshed grain and carries it to a grain elevator which lifts the grain to a filling conveyor which deposits the grain in the pair of tanks.

The invention lies in providing such a combine with a vertical transfer conveyor disposed in one of the side tanks for transferring grain to the other side tank where it is collected and removed by a discharge conveyor. More particularly, the invention contemplates utilizing a filling conveyor for both selectively filling the grain tanks and, in conjunction with the vertical transfer conveyor, for transferring grain from one side tank to the other side tank.

An example of the inventive grain tank and conveyor mechanism is shown in the accompanying drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
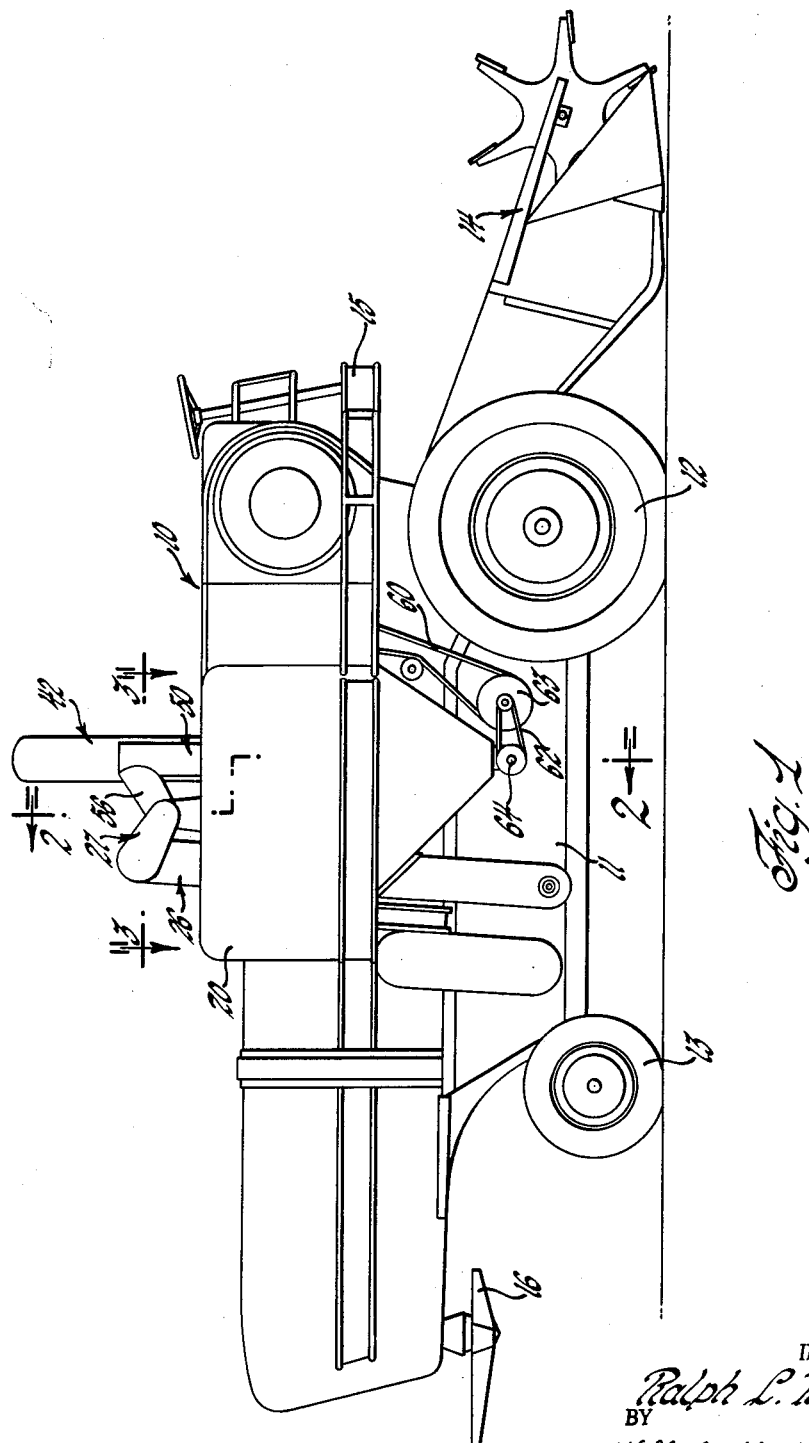
FIGURE 1 is a side elevation of a self-propelled combine embodying the present invention.

Turning first to FIGURE 1, there is shown a self-propelled combine 10 embodying the invention which includes a main body portion 11 supported by front driving wheels 12 and rear steering wheels 13. A grain header assembly 14 is supported at the forward end of the combine and an operator's platform 15 is disposed at the front of the combine so as to overlook the header assembly. The combine body 11 encloses grain cleaning and separating mechanisms, and a straw scatterer 16 is journalled at the rear of the combine.

In order to receive and temporarily store the harvested grain, the combine 10 is provided with a pair of side or saddle tanks 20 and 21 extending down along the opposite sides of the combine body 11 and which are interconnected by a center tank portion 22 lying above an upwardly sloping, or gabled top 23 of the combine body. A crop conveyor 24 collects the grain from the separating mechanism of the combine and carries it to a loading elevator 26 that lifts the grain to a filling conveyor 27 which selectively distributes the grain between the side tanks 20, 21 so that the relative loading of each tank can be varied or kept equal.

The filling conveyor 27 includes an auger 31 journalled in a channel defined by a tube 32 having discharge openings 33 and 34 one above each side tank 20, 21. Provision is made to vary the size of the opening 33 that is nearest the loading elevator 26 by an arcuate cover 35 secured to the tube 32. The cover 35 can be slid axially of the auger 31 so as to completely close, or completely open the discharge opening 33.

Figure 2:
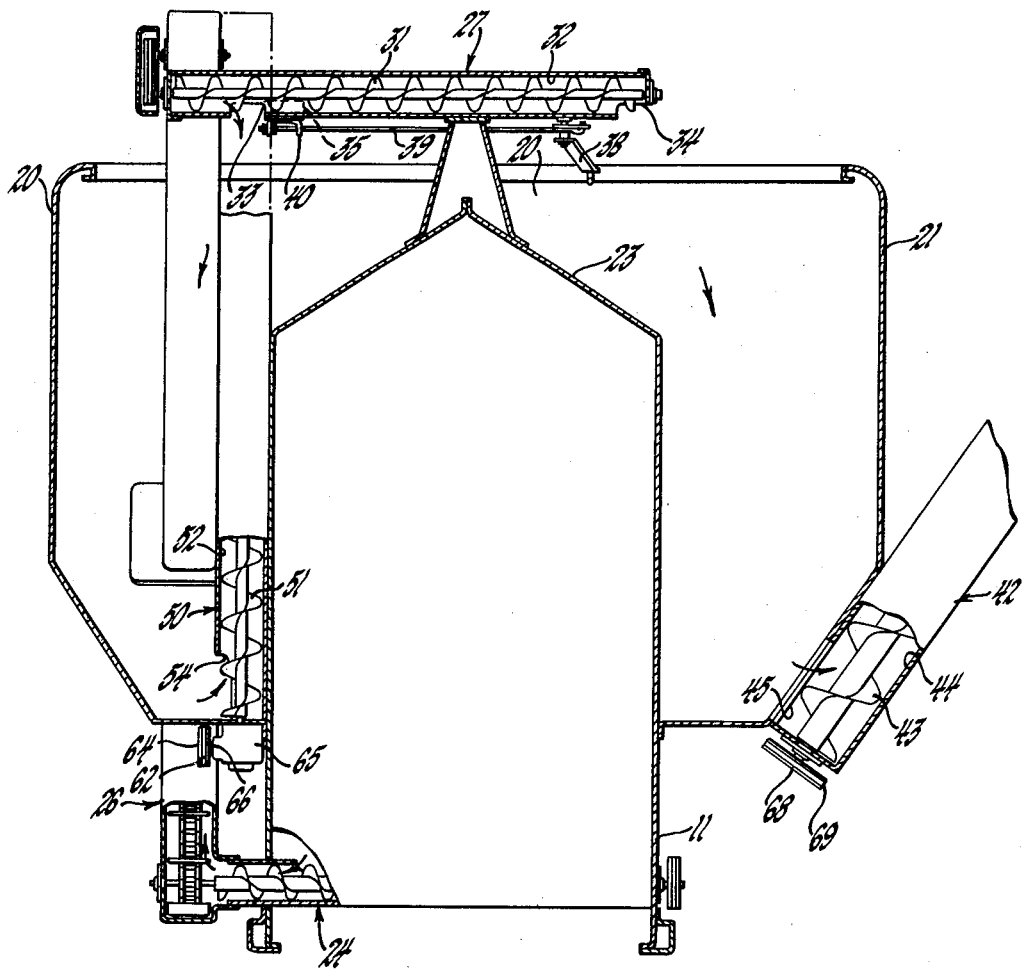
FIG. 2 is an enlarged transverse sectional view taken along line 2—2 of FIG. 1 through the storage tanks and cleaning and separating unit of the combine.
Figure 3:
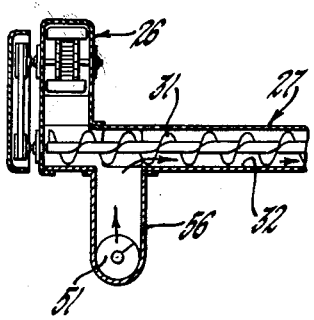
FIG. 3 is an enlarged sectional view taken substantially along the line 3—3 in FIG. 1.

To adjust the position of the cover 35, a bell crank 38 is pivoted to the underside of the tube 32 (see FIG. 2) and a control rod 39 couples one arm of the bell crank and a bracket 40 secured to the cover 35. The other arm of the bell crank 38 extends forwardly of the combine so that the operator, sitting on the platform 15, can reach behind him and rotate the bell crank to position the cover 35 as desired.

When the opening 33 is completely closed by the cover 35, all of the grain moved by the auger 31 will be deposited through the opening 34 into the side tank 21. However, as the opening 33 is uncovered by sliding the cover 35 toward the right in FIG. 2, more and more of the grain will be deposited through the opening 33 into the side tank 20, and thus less of the total amount of grain will be distributed to the tank 21. Accordingly, by positioning the cover 35 the relative amount of grain deposited in each of the side tanks can be accurately controlled.

In order to unload the combine, a discharge conveyor 42 is coupled to the side tank 21. The discharge conveyor 42 includes an auger 43 journalled in a tube 44 that extends upwardly and outwardly from the combine body 11. The discharge conveyor has an opening 45 through which grain is received from the bottom of the side tank 21.

To unload the grain from the side tank 20, a vertical transfer conveyor 50 is provided which temporarily moves the grain into the side tank 21. The transfer conveyor 50 includes an auger 51 journalled in a tubular passage 52 disposed vertically along one side of the combine cleaning and separating unit. An opening 54 in the bottom of the transfer conveyor 50 receives grain from the side tank 20 and an opening at the upper end of the transfer conveyor discharges the grain into a hood 56 coupled to the filling conveyor 27.

When grain is being unloaded from the combine, it will be apparent that the discharge opening 33 in the filling conveyor 27 is closed by the cover 35 so that grain from the side tank 20 can be transferred into the side tank 21. With this arrangement, it is possible to utilize a single conveyor 27 for both selectively filling the side tanks 20, 21 and, in conjunction with the vertical transfer conveyor 50, to transfer grain from one of the side tanks 20 into the other side tank 21. Moreover, this arrangement obviates the necessity for discharging grain from the side tank 20 through the central portion of the body 11 which contains the combine cleaning and separating mechanisms.

For driving the transfer conveyor 50, drive belts 60 and 62 couple the combine engine through a speed reducing pulley 63 to a drive pulley 64 mounted on a gear case 65. The gear case 65 encloses a shaft 66 and bevel gears (not shown) which are drivingly coupled to the auger 51. The discharge conveyor 42 is driven by a pulley 68 coupled to the auger 43 and driven by a belt 69 suitably connected to a drive pulley on the combine engine.

To facilitate the rapid unloading of the side tanks 20, 21, the discharge conveyor 42 has a larger capacity than the transfer conveyor 50 and filling conveyor 27. To this end, it will be noted that the discharge auger 43 is larger in diameter than either the transfer auger 51 or the filling auger 31. Moreover, the discharge auger 43 is rotated at a speed effective to remove all of the grain from the side tank 21 contemporaneously with the transferral of the grain in side tank 20 by the transfer auger 51 and filling auger 31. Thus, there is no danger that the grain transferred from side tank 20 into the other side tank 21 will overflow, and in this way the two side tanks can be exhausted essentially simultaneously.

I claim as my invention:

1. An agricultural harvesting machine including a body portion enclosing grain cleaning and separating mechanisms with a pair of side tanks extending down along opposite sides of the body for temporarily storing harvested grain received from the cleaning and separating mechanisms, characterized by, a grain elevator for lifting the harvested grain from the cleaning and separating mechanisms, a filling conveyor for receiving grain from said grain elevator and selectively depositing the grain into said pair of side tanks, a vertical transfer conveyor having an opening in the bottom thereof for receiving grain from one of said side tanks, and means interconnecting the upper end of said vertical transfer conveyor and said filling conveyor so that grain may be moved from said one side tank through said filling conveyor into said other side tank.

2. The harvesting machine of claim 1 including means in said filling conveyor for selectively blocking the depositing of grain into said one side tank incident to the transferral of grain from said vertical transfer conveyor through said filling conveyor into said other side tank.

3. The harvesting machine of claim 1 in which the vertical transfer conveyor is disposed in said one side tank adjacent one side of the body and said filling conveyor is disposed substantially horizontally above said body and said side tanks.

4. The harvesting machine of claim 1 including a discharge conveyor coupled to said other side tank with an opening through which grain is received from the bottom of said other side tank for unloading and depositing grain from the machine into a suitable receptacle.

5. The harvesting machine of claim 4 including separate driving means for the discharge conveyor and the vertical transfer conveyor, respectively, whereby the discharge conveyor is effective to remove all of the grain from said other side tank contemporaneously with the transferral of grain from said one side tank into said other side tank by said vertical transfer conveyor so that said pair of side tanks can be exhausted essentially simultaneously.

References Cited in the file of this patent

UNITED STATES PATENTS 2,953,360     Kline _____ Sept. 20, 1960

FOREIGN PATENTS 1,225,483     France _____ Feb. 15, 1960